(12) United States Patent
Thomas et al.

(10) Patent No.: US 12,721,255 B2
(45) Date of Patent: Sep. 1, 2026

(54) GROUND PRESSURE FEEDBACK SENSOR SYSTEM FOR CONTROLLING HEADER FLOAT

(71) Applicant: CNH Industrial America LLC, New Holland, PA (US)

(72) Inventors: Jeff Thomas, Gordonville, PA (US); Joel T. Cook, Akron, PA (US); Cory Douglas Hunt, Millersville, PA (US); Jethro Martin, Ephrata, PA (US); Joseph Woelfling, Landisville, PA (US)

(73) Assignee: CNH Industrial America LLC, New Holland, PA (US)

( * ) Notice: Subject to any disclaimer, the term of this patent is extended or adjusted under 35 U.S.C. 154(b) by 652 days.

(21) Appl. No.: 18/023,173

(22) PCT Filed: Aug. 24, 2021

(86) PCT No.: PCT/US2021/047352

§ 371 (c)(1),
(2) Date: Feb. 24, 2023

(87) PCT Pub. No.: WO2022/046769

PCT Pub. Date: Mar. 3, 2022

(65) Prior Publication Data

US 2023/0309441 A1 Oct. 5, 2023

Related U.S. Application Data

(60) Provisional application No. 63/069,388, filed on Aug. 24, 2020.

(51) Int. Cl.
*A01D 34/00* (2006.01)
*A01D 34/04* (2006.01)
(Continued)

(52) U.S. Cl.
CPC ........... *A01D 34/006* (2013.01); *A01D 34/04* (2013.01); *A01D 34/246* (2013.01); *A01D 41/141* (2013.01); *G01L 5/22* (2013.01)

(58) Field of Classification Search
CPC ....... A01B 63/1115; G01L 1/042; G01L 1/22; G01L 5/0061; A01D 41/145; A01D 41/14;
(Continued)

(56) References Cited

U.S. PATENT DOCUMENTS 3,163,974 A * 1/1965 Mack .................. A01D 41/141 56/15.2
3,886,718 A * 6/1975 Talbot ................. A01D 41/141 56/208
(Continued)

FOREIGN PATENT DOCUMENTS

CN 108012655 A * 5/2018 ........... A01D 41/141
GB 1113334 A * 5/1968 ........... A01D 41/141
(Continued)

OTHER PUBLICATIONS

International Search Report and Written Opinion for PCT Application No. PCT/US2021/047352 dated Nov. 5, 2021 (12 pages).
(Continued)

*Primary Examiner* — Adam J Behrens
(74) *Attorney, Agent, or Firm* — Buchanan Ingersoll & Rooney PC

(57) ABSTRACT

A method for dynamically operating a header float system of an agricultural vehicle having a header movably mounted to a frame of the agricultural vehicle by an actuator. The method includes: determining a target ground reaction force between the header and a ground surface located below the header, determining an actual ground reaction force between the header and the ground surface, comparing the actual
(Continued)

ground reaction force to the target ground reaction force, and upon determining that the actual ground reaction force differs from the target ground reaction force by a predetermined amount, operating the actuator to reduce a difference in value between the actual ground reaction force and the target ground reaction force. An agricultural vehicle having a header operated as described above is also provided.

24 Claims, 8 Drawing Sheets

(51) Int. Cl.
*A01D 34/24* (2006.01)
*A01D 41/14* (2006.01)
*G01L 5/22* (2006.01)

(58) Field of Classification Search
CPC .... A01D 41/127; A01D 41/141; A01D 34/00; A01D 34/02; A01D 34/24; A01D 34/04; A01D 34/243; A01D 34/246; A01D 34/28; A01D 34/286; A01D 34/283; A01D 34/006
See application file for complete search history.

(56) References Cited

U.S. PATENT DOCUMENTS

| | | | | | |
|---|---|---|---|---|---|
| 3,953,959 | A * | 5/1976 | Decruyenaere | A01D 41/145 | 56/208 |
| 4,594,840 | A * | 6/1986 | D'Almeida | A01D 41/141 | 56/11.2 |
| 4,641,490 | A * | 2/1987 | Wynn | A01D 75/287 | 56/DIG. 15 |
| 5,174,101 | A * | 12/1992 | Rabitsch | A01D 41/14 | 56/119 |
| 5,471,823 | A * | 12/1995 | Panoushek | A01D 41/141 | 56/DIG. 3 |
| 5,524,424 | A * | 6/1996 | Halgrimson | A01D 41/127 | 701/1 |
| 5,633,452 | A | 5/1997 | Bebernes | | |
| 5,924,270 | A * | 7/1999 | Bruns | A01D 75/20 | 56/320.1 |
| 7,168,226 | B2 | 1/2007 | McLean et al. | | |
| 7,222,474 | B2 * | 5/2007 | Rayfield | A01D 41/141 | 56/10.2 E |
| 8,726,621 | B2 * | 5/2014 | Ritter | A01D 41/141 | 56/10.2 E |
| 10,568,263 | B2 * | 2/2020 | Cook | A01D 57/03 | |
| 10,959,374 | B2 * | 3/2021 | Duerksen | A01D 41/141 | |
| 11,744,178 | B2 * | 9/2023 | Hunt | A01D 41/06 | 56/10.2 R |
| 2003/0010010 | A1 * | 1/2003 | Buermann | A01D 41/14 | 56/257 |
| 2003/0140609 | A1 * | 7/2003 | Beaujot | A01D 41/141 | 56/10.2 E |
| 2006/0242935 | A1 * | 11/2006 | Rayfield | A01D 41/141 | 56/10.2 E |
| 2006/0254239 | A1 | 11/2006 | Fackler et al. | | |
| 2008/0264025 | A1 * | 10/2008 | Ditchcreek | A01D 75/18 | 248/251 |
| 2010/0083629 | A1 * | 4/2010 | Klotzbach | A01D 41/14 | 56/320.1 |
| 2013/0104508 | A1 * | 5/2013 | Ritter | A01D 41/141 | 56/10.2 E |
| 2017/0020065 | A1 * | 1/2017 | Ricketts | A01D 34/03 | |
| 2019/0183049 | A1 * | 6/2019 | Cook | A01D 43/107 | |
| 2019/0327893 | A1 * | 10/2019 | Hamilton | A01D 41/141 | |
| 2020/0000032 | A1 | 1/2020 | Shearer et al. | | |

FOREIGN PATENT DOCUMENTS

| | | | |
|---|---|---|---|
| WO | 86/0002 | A1 | 1/1986 |
| WO | 2019111069 | A1 | 6/2019 |
| WO | 2020257838 | A1 | 12/2020 |

OTHER PUBLICATIONS

Substantive Technical Examination Report for Argentina Patent App. No. 20210102347, dated Sep. 13, 2024, 12 pages.
Grant Report for Argentina Patent App. No. 20210102347, dated Dec. 23, 2024, 8 pages.

* cited by examiner 102
130
402
402
112
112b
400
406
404
112a
400
112b 506
516
514
512
518
102
126
112
138
504
500
118
114
130
128
124
502
132
510
508

600
602
618
616
620
614
606
620
612
626
624
628
610
608
0.25
F
622
630
604

602
612'
612
612"
600
614
606
702
618
700
610
616
608
704
604

600
802
602
800
612
804
606
614
608
604

602
600
616
612
606
614
608
604

602
612
612'
600
606
702
618
700
616
610
608
704
604

GROUND PRESSURE FEEDBACK SENSOR SYSTEM FOR CONTROLLING HEADER FLOAT

BACKGROUND OF THE INVENTION

Various types of agricultural vehicles use headers to process crop materials. For example, windrowers (also known as swathers) are used to cut crop material and form it into windrows (a cut row or material) that is later processed, typically after drying, by other equipment. Similarly, combine harvesters use headers to process crop materials, which are conveyed into a crop processing system located on the chassis of the vehicle. In either case, it is often desirable to movably mount the header to the chassis of the vehicle to allow height adjustment and/or tilt adjustment. It is also often desirable to mount the header such that it can move to follow or "float" over undulating terrain. Similar capability is often desirable in multi-segment headers to allow an articulated portion of the header to adjust or float relative to an adjacent part of the header.

A typical self-propelled combine harvester has a header that is movably mounted to the vehicle chassis by hydraulic actuators. The hydraulic actuators comprise piston and cylinder assemblies that use hydraulic fluid to move the piston relative to the cylinder. The position of the header is controlled by changing the volume of fluid in the cylinder. Float is provided by including an accumulator in the hydraulic circuit. A typical accumulator is a reservoir that is fluidly connected to the hydraulic circuit, and contains a volume of pressurized gas. In use, as the header moves over undulating terrain, the gas can expand and contract to provide a spring-like resilience to the hydraulic circuit. Thus, the header is effectively suspended on an air spring.

It will be appreciated from the foregoing that the gas pressure dictates the spring force, and therefore controls the amount of force required to allow the header to float. The spring force can be adjusted by varying the pressurization of the accumulator. For example, in one known system, a pressure reducing valve ("PRV") is used to control the pressure. This device operates by using an electric current to set the PRV operating state. The operator can adjust the current to the PRV using a toggle switch or other controls. Such systems are functional, but can suffer from various problems that cause the actual floatation force to vary significantly for a given current setting. For example, variations in hydraulic oil temperature, hysteresis in the PRV, and changes in operating friction throughout the system, can all change the actual floatation force provided by the accumulator without any change to the input current to the PRV. Similar problems occur when the header changes weight during operation. This can happen by accumulating crop material and soil to increase in weight. Similarly, the weight of the header can reduce after initial calibration if crop material or soil on the header during calibration fall off or dry out during operation. Thus, an experienced operator must occasionally adjust the signal to the PRV to maintain the desired floatation force.

An example of a system for controlling the header position using pressurized hydraulic fluid is provided in U.S. Pat. No. 5,633,452, which is incorporated herein by reference. In this example, the header height is established by setting a pressure in hydraulic header lift cylinders, and float is provided by providing an accumulator in the hydraulic circuit. A pressure sensor is used to determine if the hydraulic pressure in the circuit drops below a minimum safe value, and automatically raises the pressure when this happens.

This system relies on sensing the hydraulic pressure of the hydraulic circuit, which can lead to problems. For example, friction in the hydraulic cylinders (so-called "stiction"), as well as at other locations such as pivots, can cause force reactions that make the hydraulic pressure of the fluid inaccurate as a measure of the actual header height setting. For example, during efforts to lift the header, a sticking hydraulic cylinder can generate high hydraulic pressure, without a corresponding increase in header height. U.S. Pat. No. 7,168,226 and U.S. Publication No. 2006/0254239 also show systems for controlling a header, and these references are incorporated herein by reference.

The inventors have determined that the state of the art of header floatation system can still be improved.

This description of the background is provided to assist with an understanding of the following explanations of exemplary embodiments, and is not an admission that any or all of this background information is necessarily prior art.

SUMMARY OF THE INVENTION

In one exemplary aspect, there is provided an apparatus for measuring ground reaction loads on a header component, the apparatus comprising: a frame; a skid shoe movably mounted to the frame between an extended position and a retracted position; and a load sensor assembly operatively connected between the frame and the skid shoe. The load sensor assembly includes a load sensor, and a spring connecting the load sensor to one of the frame and the skid shoe, with the spring being configured to generate a preload force that biases the skid shoe towards the extended position.

In some examples, the load sensor assembly further comprises an adjustable preload spacer that is selectively movable to adjust the preload force. The adjustable preload spacer may comprise a threaded rod. The threaded rod may be connected between the frame and the load sensor, and adjustable to move the load sensor towards and away from the frame. The spring may comprise one or more spring washers surrounding the threaded rod and positioned between the frame and the load sensor. The frame may be positioned between the one or more spring washers and the load sensor.

In some examples, the load sensor is operatively connected between the frame and the skid shoe by a linkage having an input end at the skid shoe, and an output end at the load sensor. The linkage may be a force-multiplying linkage in which a ratio of displacement at the input end to displacement at the output end is greater than 1:1. The linkage and spring may be configured to generate a tensile or a compressive load on the sensor. The frame may be a skid shoe backing plate, and the linkage may have a pivot arm having a first pivot connecting the pivot arm to the skid shoe backing plate. The output end of the linkage may include a second pivot connecting the pivot arm to the load sensor.

In some examples, the load sensor comprises a strain gauge.

In some examples, the load sensor comprises a closed hydraulic circuit having a pressure sensor attached thereto.

In some examples, the load sensor comprises a mechanical spring scale.

In some examples, the frame comprises a header support that is movably attached to a header frame by an actuator, and the actuator and the load sensor are operatively connected to a control system configured to operate the actuator in response to an output signal from the load sensor. The header support may extend in a forward direction from the header frame, and at least one of a draper belt roller and a cutter bar may be attached to the header support.

In some examples, the frame comprises a header that is movably attached to a vehicle chassis by an actuator, and the actuator and the load sensor are operatively connected to a control system configured to operate the actuator in response to an output signal from the load sensor.

In some examples, the frame comprises a header wing section that is movably attached to a header center section by an actuator, and the actuator and the load sensor are operatively connected to a control system configured to operate the actuator in response to an output signal from the load sensor.

In another exemplary embodiment, there is provided an agricultural vehicle having a chassis configured for movement across a surface, a frame movably mounted to the chassis, a skid shoe movably mounted to the frame between an extended position and a retracted position, an actuator operatively connected between the frame and the chassis and configured to move the frame relative to the chassis; and a load sensor assembly operatively connected between the frame and the skid shoe. The load sensor assembly comprises a load sensor, and a spring connecting the load sensor to one of the frame and the skid shoe, with the spring being configured to generate a preload force that biases the skid shoe towards the extended position. A control system is operatively connected to the load sensor and the actuator, and configured to operate the actuator in response to a signal from the load sensor.

In some examples, the frame comprises: a header main frame that is movable attached to the chassis by the actuator, a header subframe that is movably connected to a header main frame and the chassis by the actuator, or a header wing section frame that is movably attached to a header center section frame and the chassis by the actuator.

BRIEF DESCRIPTION OF THE DRAWINGS

Embodiments of inventions will now be described, strictly by way of example, with reference to the accompanying drawings, in which.

In the figures, like reference numerals refer to the same or similar elements.

DETAILED DESCRIPTION OF THE DRAWINGS

Embodiments described herein provide pressure sensing systems for determining ground reaction force between a header component and the underlying ground during operation of the header. Embodiments are shown in use with combine and windrower headers, but other embodiments may be used with other mechanisms that are contact the ground.

Figure 1:
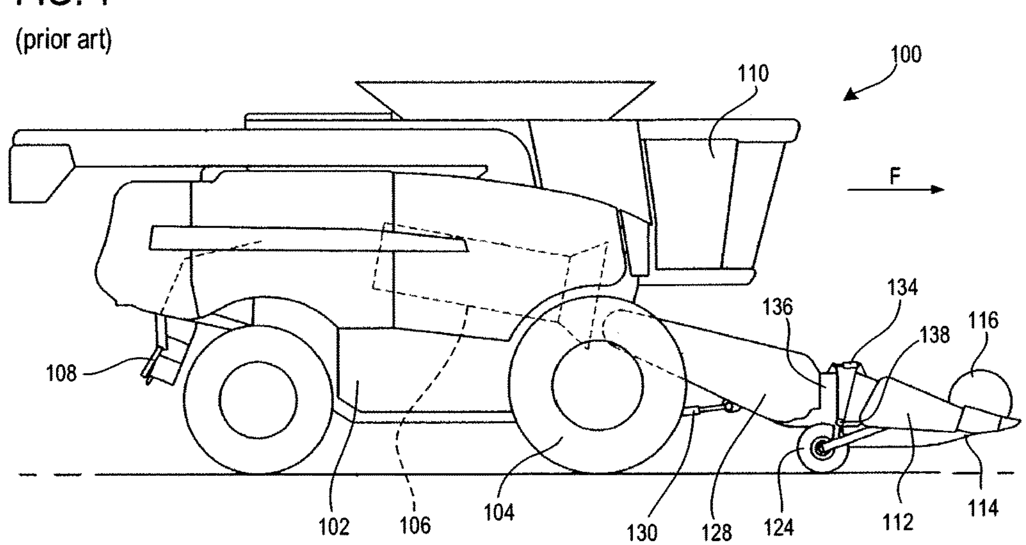
FIG. 1 is a side view of a prior art agricultural combine.

FIG. 1 illustrates an example of a prior art agricultural combine 100, with which embodiments of the invention may be used. The combine 100 includes a chassis 102 that is configured for driving on a surface (e.g., the ground or a road), such as by being supported by pneumatic wheels 104, tracked wheel assemblies, or the like. The combine 100 includes a threshing and separating system 106 mounted on or within the chassis 102. The threshing and separating system 106 may include mechanisms such as one or more threshers (e.g., an axial flow thresher), sieves, blowers, and the like, as well as an associated grain hopper and unloader. Threshing and separating systems 106 and their associated components are well-known in the art, and need not be described in detail herein. The combine 100 also may include other features, such as a spreader 108, operator cab 110, and the like.

Figure 2:
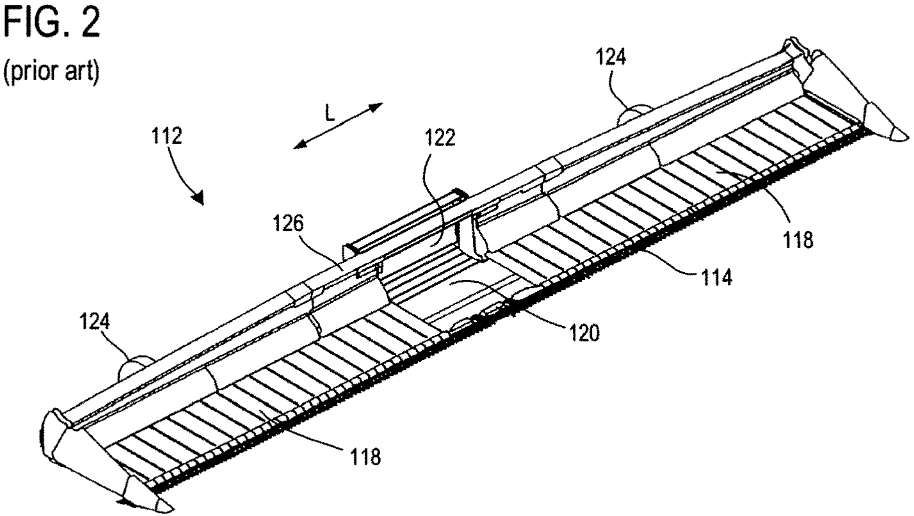
FIG. 2 is an isometric view of a prior art header.
Figure 3:
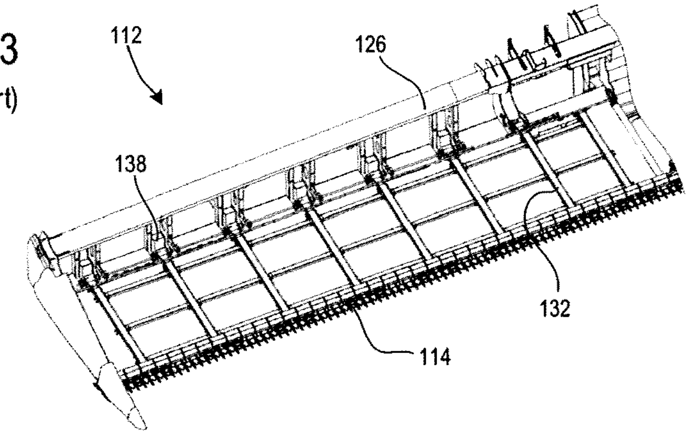
FIG. 3 is an isometric view of a portion of a prior art header frame.

Referring also to FIGS. 2 and 3, the combine 100 also includes a header 112, which is configured to cut and harvest crop material from the ground as the combine 100 drives in the forward direction F. For example, the header 112 may include one or more cutter bars 114 located at or near the leading edge of the header 112 to cut crops at or near the ground level, and one or more reels 116 configured to pull the crop material backwards towards the header 112. The header 112 also may include crop conveyors 118 that are configured to move the crop material at the lateral ends of the header 112 towards the center of the header 112. The crop conveyors 118 may be in the form of belts, auger screws, or the like. At the center, the header 112 may include a feeder conveyor 120 that conveys the crop material backwards towards a crop outlet 122. The header 112 also may include gauge wheels 124 or skids to control the height of the header 112 over the ground.

The header 112 is built on a frame 126, which is attached to the chassis 102 of the combine 100 by a feeder housing 128. The feeder housing 128 is configured to convey crop material backwards from the header 112 to the threshing and separating system 106. The feeder housing 128 may be movable by one or more feeder housing actuators 130 to raise and lower the header 112 relative to the ground.

The header 112 also includes a number of supports 132 that extend forward from the frame 126 to hold parts such as the cutter bar 114, conveyors 118, or the like. The supports 132 may be rigidly attached to the header 112, or attached by movable mounts, such as pivots or linkages. In the case of movable supports 132, a suspension may be used to control the motion of the supports 132. For example, each support 132 may have its own spring and/or damper system 138, which is intended to allow the supports 132 to move up and down individually or in groups to follow local undulations along the lateral direction L. Skids, gauge wheels or other ground supports may be located below the supports 132 to generate a lifting force via contact with the ground. The positions of the ground supports and the spring and damping properties of the movable connections may be adjustable to tailor the header 112 for use in particular operating conditions. In addition, the positions of the supports 132, such as their angular orientation (downward tilt) relative to the frame 126 may be adjustable.

As noted above, the feeder housing may have actuators 130 to raise and lower the entire header 112. Additional position control may be provided by a tilt actuator 134 that controls the angle of the frame 126 relative to an anchor plate 136 mounted on the feeder housing 128. For example, the tilt actuator 134 comprises a double-acting hydraulic actuator that is operated to pivot the frame 126 about a frame pivot axis.

The exemplary header 112 in FIGS. 1-3 is a unitary header having a single frame 126 that extends continuously between the ends of the header 112 in the lateral direction L. In other embodiments, such as shown in FIG. 4, the header 112 may comprise a multi-segment or articulated header having a center section 112*a* and wing sections 112*b* movably attached to the lateral ends of the center section by pivots 400 or linkages, with actuators 402 configured control the heights of the wing sections 112*b*.

Figure 4:
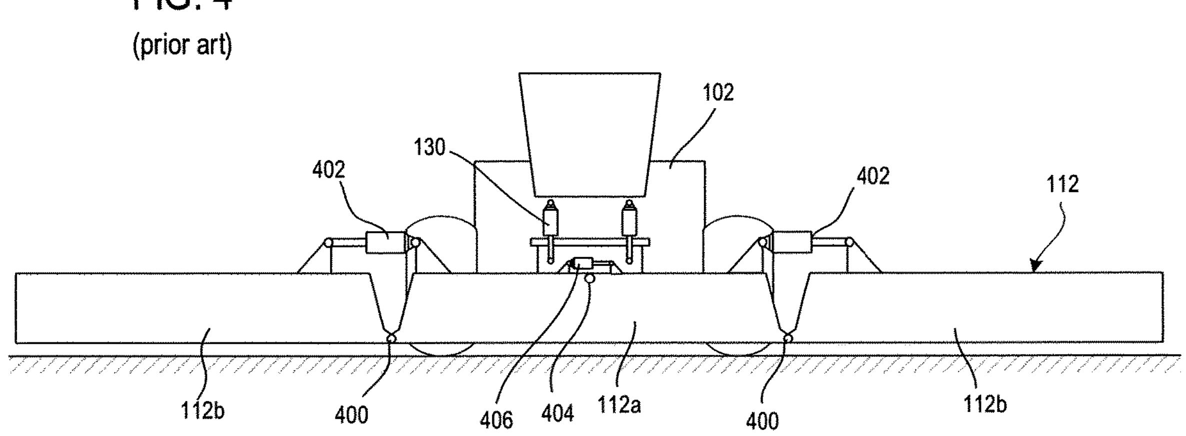
FIG. 4 is a schematic front view of an agricultural vehicle having a segmented header.

As also shown in FIG. 4, a header 112 (unitary or articulated) also may be attached to the chassis 102 by a longitudinal pivot 404 that allows the header 112 to tilt about a forward-extending horizontal axis to account for operation on pitched terrain, and an actuator 406 may be provided to control movement about the longitudinal pivot 404.

The inventors have determined that the operation of the header 112 can be improved by operating one or more position control actuators 130, 134, 138, 402, 406 using measurements of reaction forces between the header 112 (or subassemblies thereof) and the ground.

Figure 5:
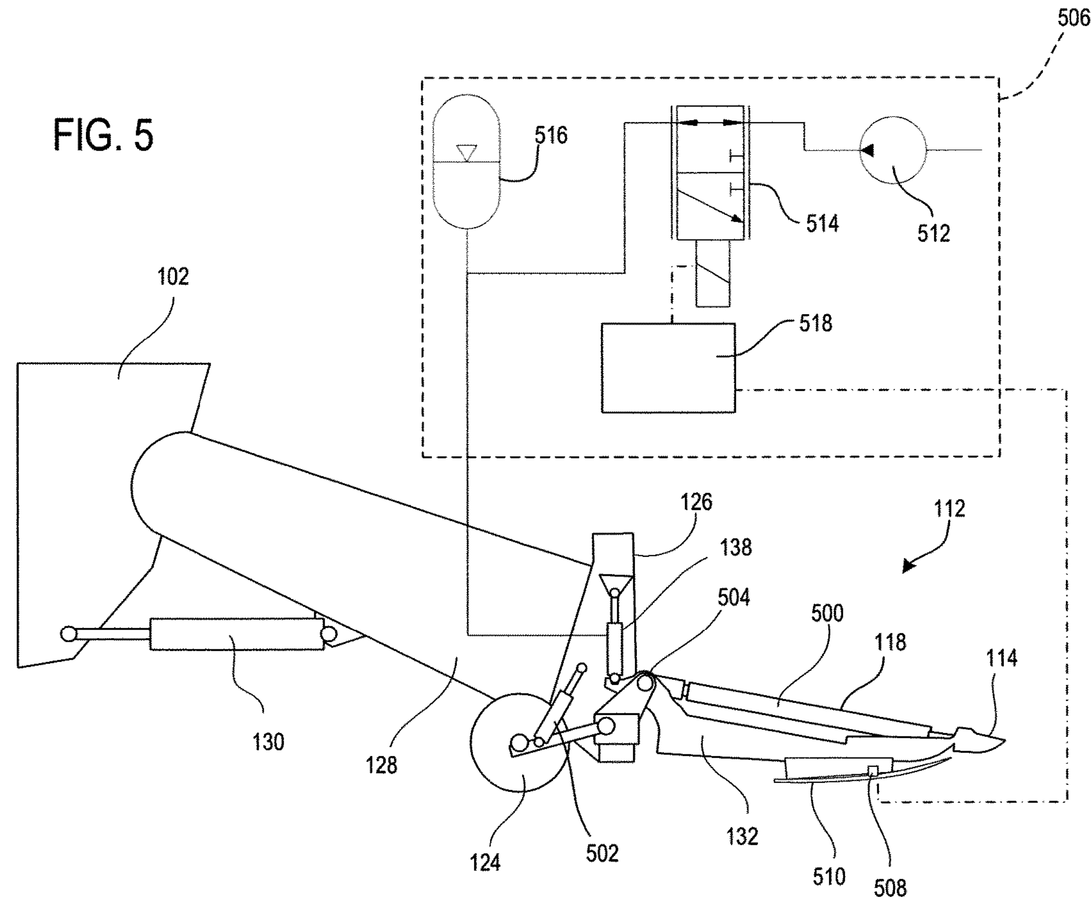
FIG. 5 is a schematic view of a header with a floating header subassembly, and an exemplary header float control system.

FIG. 5 illustrates an exemplary float control system that uses ground reaction force feedback to control one or more actuators that support the header 112. The exemplary header 112 has a frame 126 with forward-extending supports 132 that hold operating components such as cutter bars 114 and conveyor rollers 500 that support conveyors 118. This is a typical arrangement for a draper head having lateral belts 118 and an infeed belt 120, such as shown in FIG. 2. The supports 132 are suspended, at least in part, by one or more actuators 138, such as the shown hydraulic cylinders. The header 112 may be attached to the chassis 102 by a feeder housing 128 containing a feeder belt (not shown). The assembly also may include various additional suspension components for adjusting the position of the header 112 relative to the chassis 102 and/or ground. Such components may include, for example, a feeder housing actuator 130 to raise and lower the entire header 112, a gauge wheel actuator 502 to support the frame 126 on the ground, and other actuators such as discussed above.

The supports 132 are attached to the frame 126 by pivots 504 or other movable connections (e.g., linkages or telescoping connectors). During operation, the supports 132 are lowered into contact with the ground, and a hydraulic control system 506 is used to regulate the amount of force between the supports 132 and the ground. For simplicity, the example shows the control system 506 operating the support actuators 138 to regulate the ground force. It will be appreciated from the present disclosure, however, that other actuators, such as the gauge wheel actuators 502 and feeder housing actuator 130, can also have a bearing on the ground force between the supports 132 and the ground, and also may be part of the control system. It will also be appreciated that each support 132 may have its own support actuator 138, or multiple supports 132 may share a single support actuator 138. Furthermore, the control system 506 may operate each support actuator 138 independently, operate multiple support actuators 138 as groups, or operate all of the support actuators 138 collectively. Other alternatives and variations will be apparent to persons of ordinary skill in the art in view of the present disclosure.

The control system 506 operates using feedback from one or more load sensors 508 that are operatively connected to skid shoes 510 mounted to the bottoms of one or more of the supports 132. Each support 132 may have its own skid shoe 510 and load sensor 508, or some supports 132 may not include a load sensor 508, or some supports 132 may not have a load sensor 508 or a skid shoe 510.

The control system 506 may use any suitable configuration of electronic and/or hydraulic controls. In the shown example, the control system 506 receives pressurized hydraulic fluid from a pump 512 and directs the pressurized fluid through a hydraulic circuit to a one-way or two-way hydraulic actuator 138 that controls the position of the support 132 relative to the header frame 126. The hydraulic circuit includes, for example, a pressure reducing valve 514 and an accumulator 516. An electronic control unit 518 (e.g., computer processor unit, circuit on a chip, a software module operating on an existing vehicle control system, or the like) is provided to receive output from the load sensors 508 and convert this into instructions to regulate the output of the pressure reducing valve 514 to thereby regulate ground force at the load sensors 508. Additional controls, such as a valve to control the fill level of the hydraulic actuator 138, check valves, drain valves, and so on, may be included in the hydraulic circuit, as known in the art.

The details of the control system operation are not relevant to the inventions described herein. Nevertheless, as one example, the electronic control unit 518 may have non-transient software instructions stored in a memory, and these instructions, when executed, measure the sensor output of the load sensors 508, compare these to a selected or predetermined threshold or target value, and increase or decrease the pressure output of the pressure reducing valve 514 to move the load sensor output values to remain within the threshold value or to move towards the target value. Other alternatives and variations will be apparent to persons of ordinary skill in the art in view of the present disclosure.

The reliability and usefulness of the control system 506 is expected to depend, at least in part, on the manner in which the load sensors 508 are integrated into the header components. A variety of different configurations are possible, but it is believed that integrating the load sensors 508 between flexible skid shoes and a relatively static frame member is expected to provide a durable and reliable load sensing system.

Figures 6, 7:
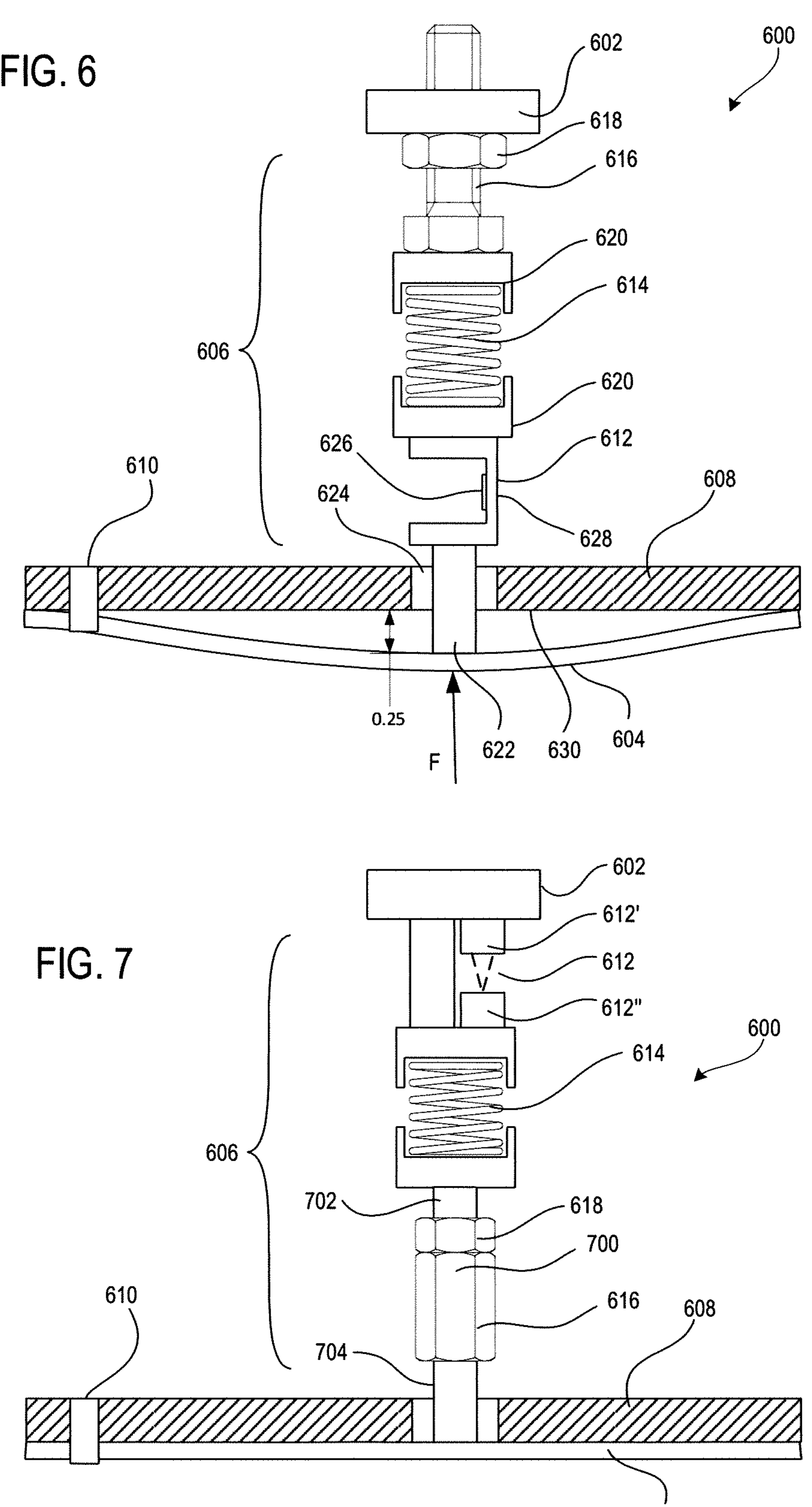
FIG. 6 illustrates a first exemplary apparatus for measuring ground reaction force.
FIG. 7 illustrates a second exemplary apparatus for measuring ground reaction force.

An example of such a system is illustrated in FIG. 6, which schematically illustrates an apparatus 600 for measuring ground reaction loads on a header component. The apparatus 600 generally includes a frame 602, a skid shoe 604 that is movable relative to the frame 602, and a load sensor assembly 606 that is operatively connected between the frame 602 and the skid shoe 604. The frame 602 may comprise essentially any part of a header assembly that is movable relative to the skid shoe 604, such as a header frame 126, a support 132, and so on. As explained below, the frame 602 also may comprise a backing plate 608 to which the skid shoe 604 is attached. The skid shoe 604 may comprise a flexible sheet of material, such as a durable high density plastic as known in the art, or a rigid panel that is mounted to the frame by a movable connection, such as a pivot or a slider.

In the shown example, the skid shoe 604 is a flexible polymer sheet that is connected by rivets 610 or otherwise secured to a comparatively rigid metal backing plate 608 at one or more locations. The backing plate 608 may be rigidly connected to the remainder of the frame 602, but this is not strictly required in all cases. The skid shoe 604 is positioned where it contacts the underlying ground during use, and is movable between an extended position such as shown in FIG. 6, and a retracted position such as shown in FIG. 7. The direction of extension/retraction preferably is generally perpendicular to the ground surface or oriented at an angle corresponding to a direction of reaction force with the underlying ground, such that ground reaction forces tend to displace the skid shoe 604 from the extended position towards the retracted position.

The load sensor assembly 606 may be operatively connected to transmit force between the skid shoe 604 and frame 602 using any suitable arrangement of connecting parts, such as bolts, rivets, weldments, and so on. The load sensor assembly 606 includes a load sensor 612 and a spring 614 that connects the load sensor to the frame 602 or the skid shoe 604, and such connection may be direct or via intervening parts. The spring 614 is configured to generate a preload force that biases the skid shoe 604 towards the extended position. For example, in the embodiment of FIG. 6, the spring 614 is connected between the frame 602 and a top end of the load sensor 612, with the spring 614 in a partially-compressed state. Thus, the spring 614 generates a restoring force that pushes the load sensor 612 away from the frame 602, and thus pushes the skid shoe 604 away from the frame 602 by the intervening load sensor 612.

The amount of preload force may be adjusted by an adjustable preload spacer 616. The preload spacer 616 is used to selectively increase a distance between the skid shoe 604 and the frame 602, and thereby increase loading on the spring 614. For example, in FIG. 6, the preload spacer 616 comprises a threaded rod or bolt that fits into a threaded hole in the frame, and can be rotated to change a displacement between the spring 614 and the frame 602 to increase or decrease the preload force. A lock nut 618 may be provided to hold the threaded bolt in the final desired position. The preload spacer 616 also may conveniently be configured to allow easy assembly and disassembly of the apparatus 600, by being configured to move far enough to remove all preload force from the spring 614.

The various parts of the load sensor assembly 606 may be attached to each other in any suitable way. For example, the spring 614 may be captured between spring seats 620, with one spring seat 620 being fastened to one end of the load sensor 612. The other end of the load sensor 612 may be attached to the skid shoe 604 by a post 622 that extends through a hole 624 through the backing plate 608.

It will be appreciated from the foregoing explanation that the load sensor 612 is positioned to support the skid shoe 604 in the extended position. Thus, the load sensor 612 transmits ground reaction loads F that are applied to the bottom of the skid shoe 604 to the frame 602. The skid shoe 604 will stay in the extended position as long as the reaction load F is less than the spring preload force. Thus, the load sensor 612 can be used to measure the magnitude of the ground reaction force F, in a relatively isolated manner, essentially until the ground reaction force F exceeds the preload force and moves the skid shoe 604 towards the retracted position. As the ground reaction force F surpasses the preload force, the spring 614 compresses until the spring 614 is fully collapsed, or, more preferably, until the skid shoe 604 encounters a travel stop 630, such as the facing surface of the backing plate 608.

In use, the load sensor 612 output is operatively connected to a control system 506, which is configured to operate one or more actuators in response to the detected load sensor output, such as described above.

The load sensor 612 may comprise any suitable load sensing device. In FIG. 6, the load sensor 612 comprises a strain sensor having one or more strain gauges 626 attached to a plate 628 having known material and dimensional properties. The output of the strain gauge(s) represents strain of the plate under the applied load, and this output can be converted to a load force, as known in the art of strain gauges.

Figure 8:
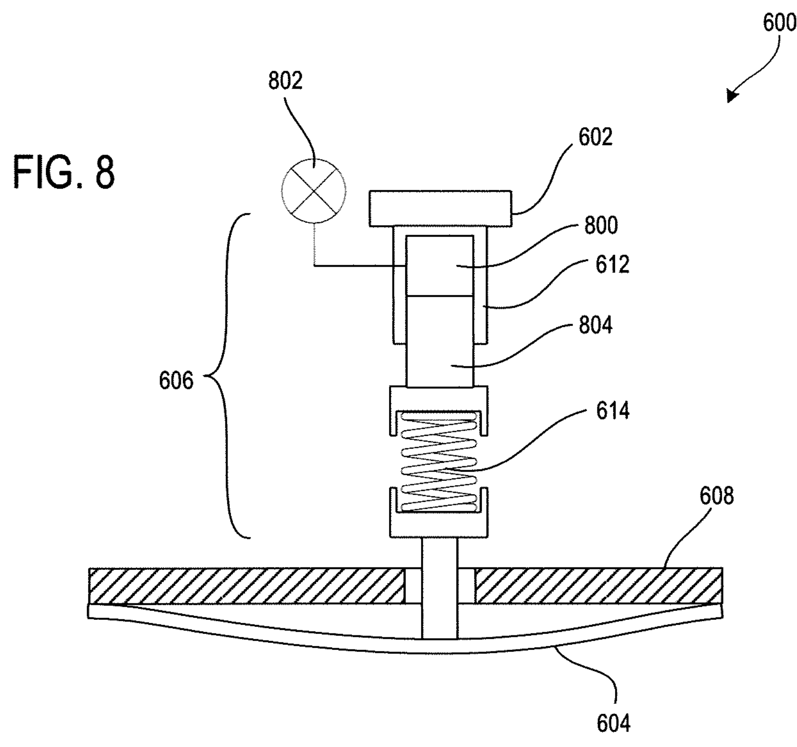
FIG. 8 illustrates a third exemplary apparatus for measuring ground reaction force.
Figure 9:
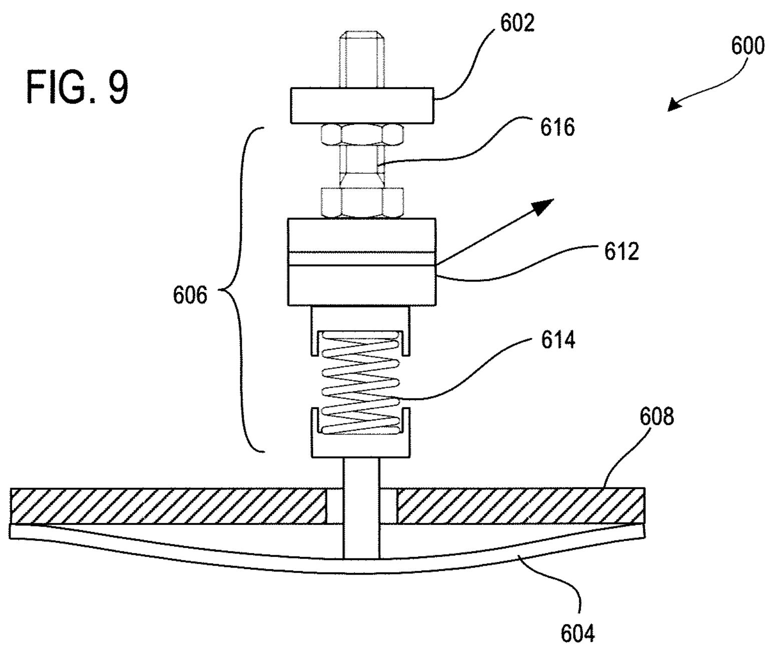
FIG. 9 illustrates a fourth exemplary apparatus for measuring ground reaction force.

It will be readily appreciated that the foregoing apparatus 600 may be modified in various ways. FIGS. 7-9 show various non-limiting exemplary modifications to the apparatus 600.

FIG. 7, shows the apparatus 600 with the skid shoe 612 in the retracted position, with the skid shoe 604 abutting the backing plate 608, which acts as a travel stop. In this example, the positions of the load sensor 612 and the preload spacer 616 are reversed, and the preload spacer 616 comprises a turnbuckle having a threaded coupling 700 that engages a first rod 702 that is threaded in one helical direction, and a second rod 704 that is threaded in the opposite helical direction. A locknut 618 is again provided to secure the coupling 700 at the desired location. FIG. 7 also illustrates a preferred configuration in which the spring 614 is at least partially extended when the skid shoe 604 is in the retracted position, which helps prevent excessive ground reaction forces F from being transmitted to the load sensor assembly 606. Finally, FIG. 7 shows the load sensor 612 in the form of an optical position sensor. In the shown example, the optical position sensor is configured to measure a distance between an emitter/receiver 612' and a target surface 612", with the distance being calibrated to output a signal that can be correlated with loading. In other cases, an optical position sensor might simply measure when the target surface is within a detectable range (e.g., a binary or on/off position sensor), as may be accomplished using a collimated infrared emitter/receiver pair that only receives a reflected signal when the target surface is within a predetermined distance.

FIG. 8 shows another embodiment in which the apparatus 600 is modified by positioning the spring 614 directly adjacent to the skid shoe 604, and replacing the strain-gauge type load sensor with hydraulic load sensor 612. The hydraulic load sensor 612 comprises a closed fluid chamber 800 that is fluidly connected to a hydraulic pressure gauge 802. Forces applied to the load sensor 612 can be measured as changes in hydraulic pressure. The pressure sensor 802 may include a transducer to convert pressure into a signal that can be registered by an electronic control system, as known in the art. The closed fluid chamber 800 also may be used as a preload spacer 616 by adjusting the volume of fluid in the chamber 800 to move the piston 804 towards or away from the frame 602.

FIG. 9 shows another embodiment in which the apparatus 600 is modified by transposing the positions of the load sensor 612 and spring 614 as compared to the embodiment of FIG. 6. In addition, the strain gauge type load sensor is replaced with a piezoelectric or mechanical spring scale sensor, such as known in the art.

While the foregoing examples all have an adjustable preload spacer 616, it will be appreciated that an adjustable spacer may be replaced by static spacers, such as a simple metal block that is installed to provide the desired skid shoe displacement. Other embodiments may use other kinds of adjustment mechanisms, such as shims that may be inserted and removed to change the spacing, or wedges that may be slid to change the spacing. Other alternatives and variations will be apparent to persons of ordinary skill in the art in view of the present disclosure.

It will be readily appreciated that the positions of the load sensor 612, spring 614, preload spacer 616, and other parts may be modified by transposing the components in various other ways, by including other interconnecting parts or mechanisms, or by using different mechanisms to perform the roles of the illustrated parts. Examples of more detailed modifications are shown in FIGS. 10A-10B and 12A-12B.

Figure 10A:
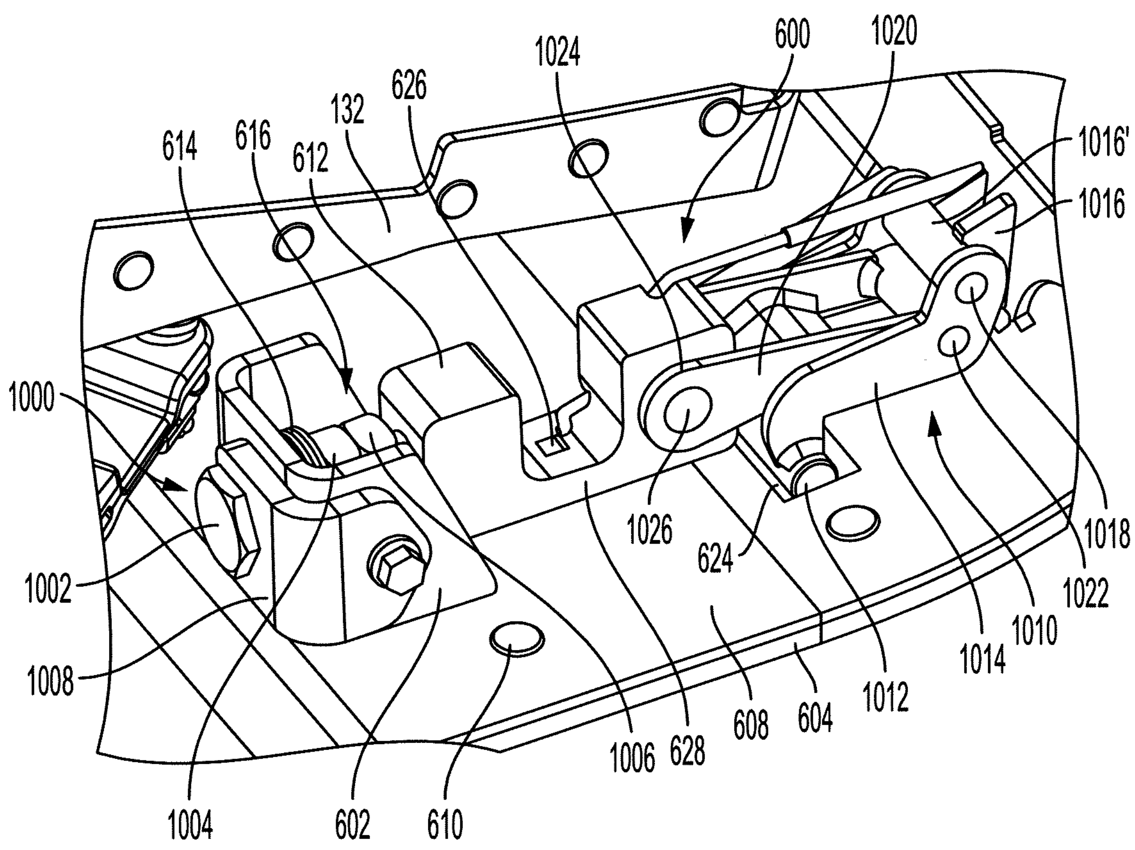
FIGS. 10A and 10B illustrate a fifth exemplary apparatus for measuring ground reaction force.
Figure 10B:
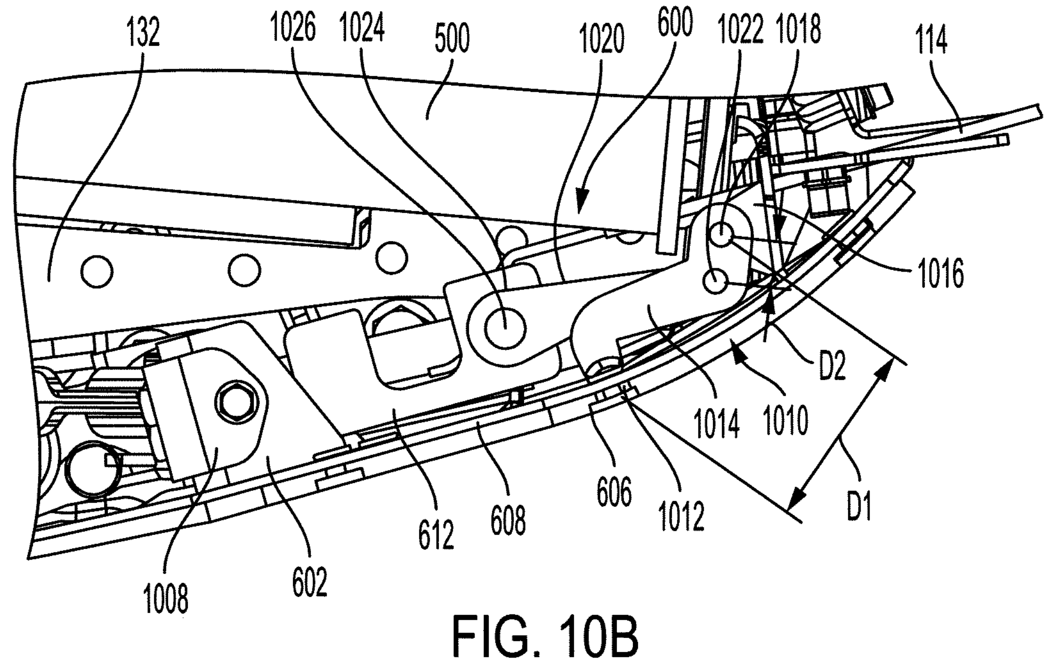
Figure 11:
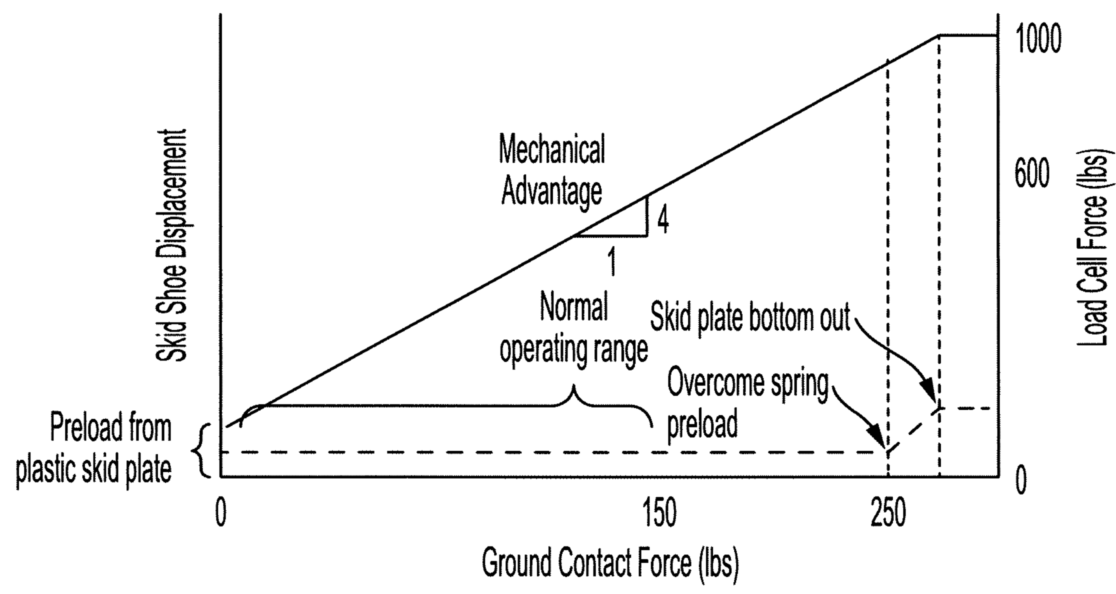
FIG. 11 illustrates an exemplary displacement and load detection curve for a header component operating at different ground forces.

FIGS. 10A and 10B show two views of a linkage-operated apparatus 600 for measuring ground reaction loads. As before, the apparatus 600 has a load sensor 612 operatively connected between a skid shoe 604 and a frame 602. In this case, the frame 602 comprises a bracket mounted to the inner surface of a skid shoe backing plate 608. The backing plate 608 comprises a metal plate, which is significantly more rigid than the flexible polymer skid shoe 604. Thus, the skid shoe 604 can flex away from the backing plate 608 and towards the underlying ground surface. The backing plate 608 may be attached directly to a header frame, or it may be attached to a header subframe such as a forward-extending support 132 that holds mechanisms such as a cutter bar 114 and a draper belt roller 500, as discussed above.

The load sensor 612 is operatively connected to the frame 602 by a preload spacer 616 in the form of a bolt 1000, which extends from a bolt head 1002, through the frame 602, and into a threaded hole on one side of the load sensor 612. The spring 614, which comprises a coil spring or one or more stacked spring washers (e.g., wave plate washers, Bellville washers, etc.), is positioned between the frame 602 and an adjustment nut 1004 that is threaded onto the bolt 1000. A lock nut 1006 is threaded onto the bolt 1000 adjacent the adjustment nut 1004, and can be tightened against the adjustment nut 1004 to secure the adjustment nut 1004 against rotation. Similarly, a bolt head keeper 1008 is secured to the frame 602, and includes a forked opening that receives the bolt head 1002 to prevent it from rotating but allows is to slide axially.

The load sensor 612 is operatively connected to the skid shoe 604 by a linkage 1010. The linkage 1010 has an input end 1012 that is connected to or placed against the inner surface of the skid shoe 604. The input end 1012 is attached to or formed as part of a first link 1014, which is pivotally connected to a bracket 1016 that is secured to the frame 602 (in this case, the backing plate 608). In the shown example, the first link 1014 is pivotally connected to the bracket 1016 by a pin 1018 that passes through a cylindrical boss portion 1016' of the bracket 1016, but it could alternatively be seated in a concave open face of the bracket 1016 and held in place by a preload force generated by the spring 614. In other cases, the bracket 1016 may comprise holes that capture the pin 1018 in place, or other structures may be used to provide a pivoting connection.

The linkage 1010 has a second link 1020 that is connected to the first link 1014 by a pin 1022. The second link 1020 extends to an output end 1024 of the linkage 1010, which is connected to the load sensor 612 by an output pin 1026. The position of the pin 1022 connecting the second link 1020 to the first link 1014 dictates the mechanical advantage, i.e., the motion and force multiplication ratio, of the linkage 1010. For example, in the shown example, a first distance D1 from the input end 1012 and the first link pivot 1018 is equal to four times a second distance D2 from pin 1022 to the first link pivot 1018. Thus, the ratio of displacement of the input end 1012 to the output end 1024 is 4:1, and the force directed by the output end 1024 to the load sensor 612 is equal to four times the amount of force generated to displace the input end 1012.

The input/output ratio of the linkage 1010 may be selected according to various criteria. For example, the selection of the spring 614, the type of load sensor 612 and its operating range, and the desired displacement of the skid shoe 604 may be considered when selecting the linkage input/output ratio. It is expected that it will be beneficial in many cases to use a force-multiplying linkage, in which the ratio of displacement at the input end 1012 to displacement at the output end 1024 is greater than 1:1, in order to provide relatively little overall movement of the system, a compact configuration, and high perceived force generation at the load sensor 612. However, other embodiments may have a force-reducing linkage, in which the ratio of displacement at the input end 1012 to displacement at the output end 1024 is less than 1:1. A unitary linkage (i.e., a displacement ratio of 1:1) also may be used.

The reaction load detecting apparatus 600 is set up for use by adjusting the preload spacer 616 to displace the skid shoe 604 from the skid plate 608 to the extended position, and establish a preload force on the spring 614 to bias the skid shoe 604 towards the extended position. For example, starting in the position shown in FIGS. 10A and 10B, the lock nut 1006 is loosened from the adjustment nut 1004, and the adjustment nut is turned to pull the bolt head 1002 towards the frame 602 against the bias of the spring 614. As the bolt head 1002 moves towards the frame 602, the bolt 1000 pushes the load sensor 612 towards the linkage 1010. This motion reverse-drives the linkage from the output end 1024 to displace the input end 1012, which pushes the skid shoe 604 towards the extended position. When the bolt head 1002 eventually contacts the frame 602, the load sensor 612 and linkage 1010 can no longer displace to extend the skid shoe 604, and this defines the final extended skid shoe position. The final extended position can be adjusted by rotating the bolt 1000 to move the head 1002 further from or closer to the load sensor 612. Once adjusted, the bolt head keeper 1008 is installed to prevent further rotation of the bolt 1000 relative to the frame 602 and load sensor 612, and the lock nut 1006 is tightened against the adjustment nut 1004 to prevent further rotation of the adjustment nut 1004 relative to the bolt 1000.

The spring 614 preferably is selected such that it does not fully compress (i.e., bottom out or reach its minimum stack height) during either the initial adjustment to place the skid shoe 604 in the extended position, or upon applying a ground reaction force to move the skid shoe 604 to the retracted position (e.g., stopped against the backing plate 608) against the bias of the spring 614. This can be accomplished using a straightforward selection of spring rate and operating length, as known in the art.

As noted above, the preload force from the spring 614 holds the skid shoe 604 in the extended position. Thus, ground reaction forces on the skid shoe 604 must overcome this preload force to start driving the skid shoe 604 towards the retracted position. FIG. 12 illustrates a typical load reaction diagram. The left y-axis shows skid shoe displacement (dashed line), the right y-axis shows measured force at the load sensor (solid line), and the x-axis shows ground contact force. As the ground contact force increases, the measured load cell force increases generally linearly, and, in this example, according to a 4:1 force multiplication provided by the linkage 1010. Once the ground contact force exceeds the spring preload, the skid shoe displaces upwards while the measured force continues rising linearly. When the skid shoe bottoms out on the travel stop, the load at the load sensor reaches a maximum value due to the excess ground reaction forces being carried by the travel stop or other supporting structures. The magnitude of displacement between overcoming the preload and bottoming out preferably is minimized to prevent changes in operating geometry during use.

From the foregoing, it will be appreciated that the output of the load sensor 612 can be calibrated to subtract out the preload force from the spring 614, and then used to proportionately measure changes in ground contact force. Thus, the load sensor 612 can be used to modulate the ground contact force using a control system 506 such as the one described above.

Figure 12A:
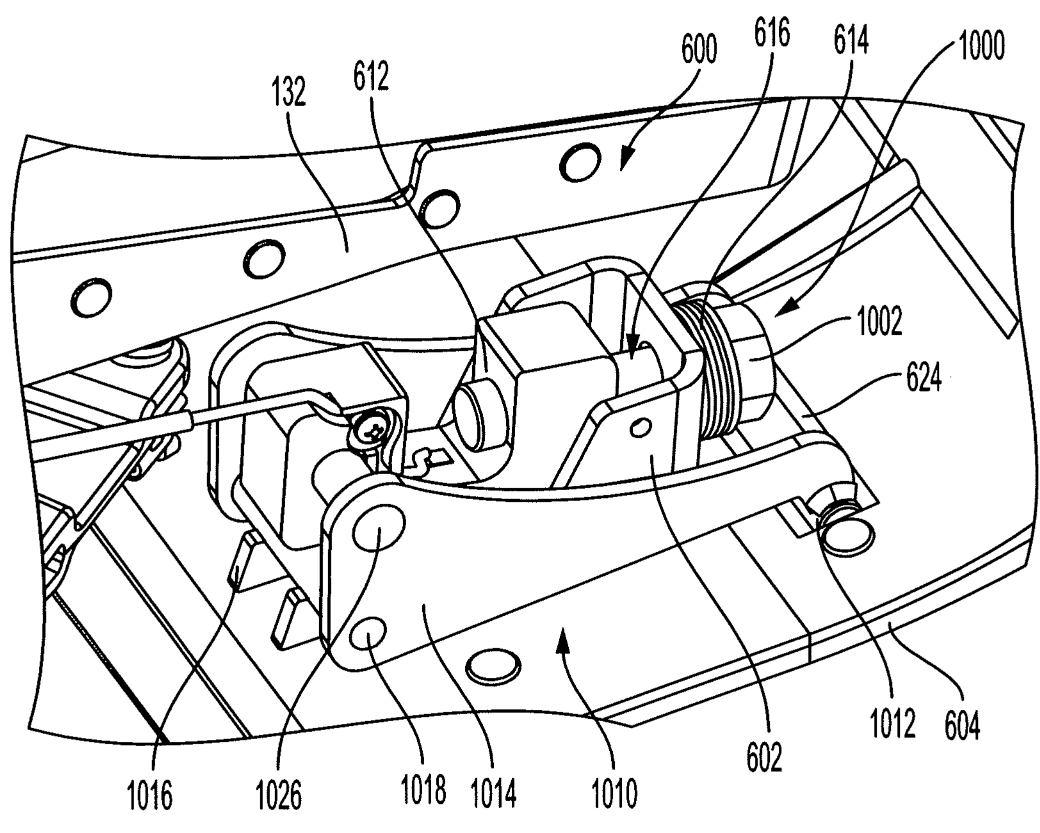
FIGS. 12A and 12B illustrate a sixth exemplary apparatus for measuring ground reaction force.
Figure 12B:
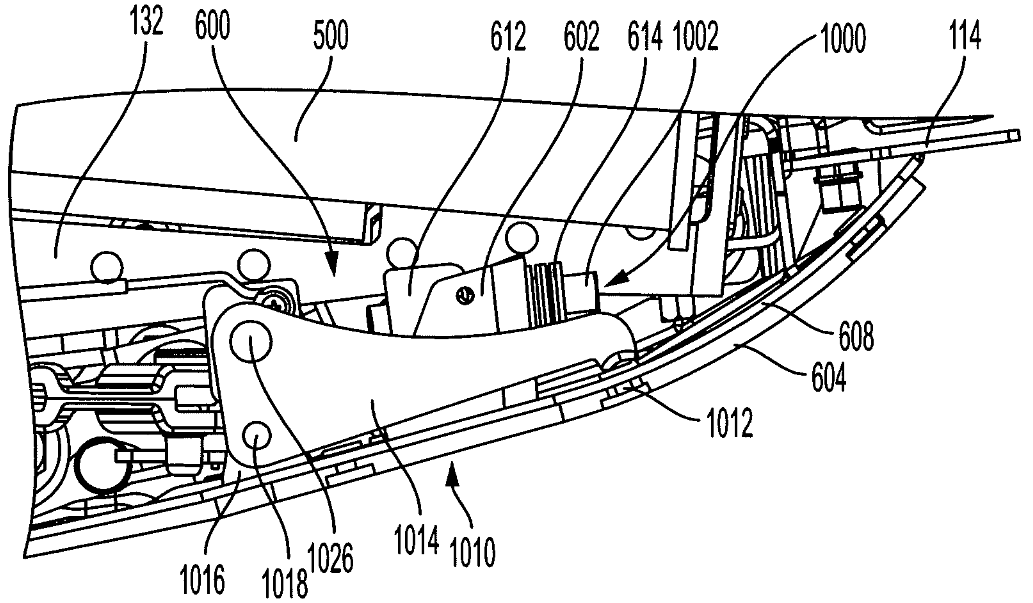

FIGS. 12A and 12B show another example of a ground reaction force sensing apparatus 600 having a linkage 1010. In this case, the linkage includes a single link 1014 that is pivotally connected to the frame 1016 by a pivot pin 1018. The link 1014 has an input end 1012 that passes through an opening 624 in the backing plate 608 to contact the skid shoe 604. The link 1014 also has an output end in the form of an output pin 1026 that connects the link 1014 to the load sensor 612. The ratio of a first distance between the pivot pin 1018 and the input end 1012 and a second distance between the pivot pin 1018 and the output pin 1026 defines the mechanical advantage of the linkage 1010, similarly to the previous embodiment. The shown mechanical advantage is approximately 4:1 (force multiplying), but other ratios may be used.

The linkage 1010 in FIGS. 12A and 12B also differs from the previous linkage 1010 by operating in tension, rather than compression. That is, ground reaction loads are converted into a force that pulls the load sensor 612 in tension, rather than forces that compress the load sensor 612. Operating the load sensor 612 in tension in this example also requires a reconfiguration of the spring 614. Specifically, the spring 614 is captured between the head 1002 of an adjustment bolt 1000 and the frame 602 (as before, the frame 602 is a bracket formed as part of the backing plate 608). The bolt 1000 extends through the frame 602 and is threaded into a hole in the load sensor 612. Rotating the bolt 1000 to move the load sensor 612 towards the frame compresses the spring 614, and pulls the load sensor 612 and linkage 1010 to move the skid shoe 604 to the extended position. In use, ground reaction forces pull against the preload of the spring 612 to move the skid shoe 604 towards the retracted position. The operation is otherwise generally like the embodiment of FIGS. 10A and 10B.

Figure 13:
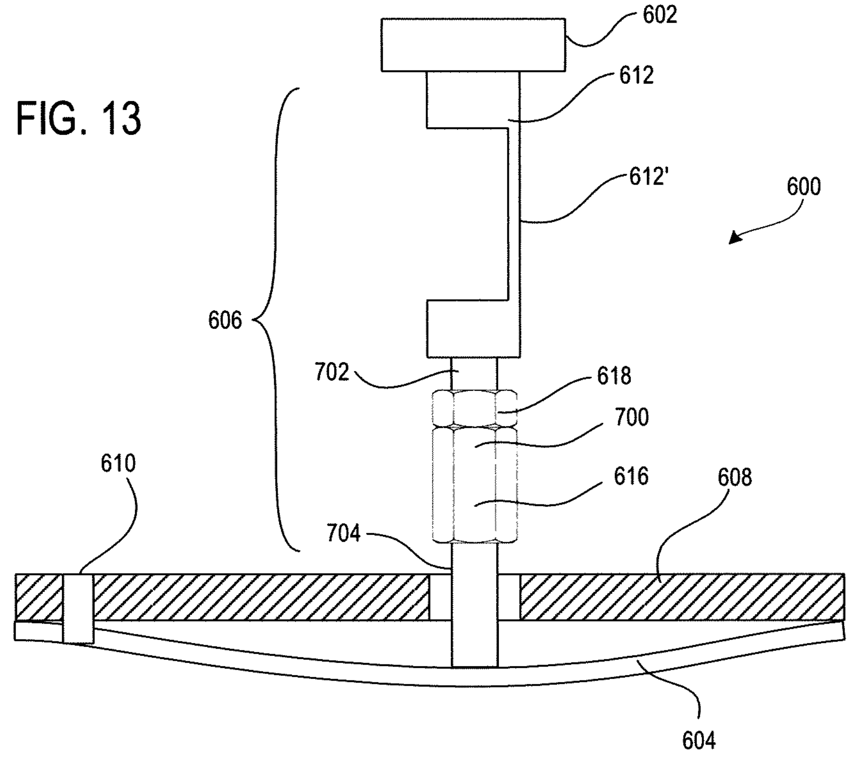
FIG. 13 is a seventh exemplary apparatus for measuring ground reaction force.

While the foregoing embodiments generally describe the load sensor assembly as having a load sensor and a spring, a separate spring is not strictly required. Other embodiments may omit the separate spring. For example, FIG. 13 illustrates a final exemplary embodiment in which a separate spring 614 is omitted. In this case, the preload force may be generated by the preload spacer, and the load sensor 612 may include an integral spring structure that deforms to allow the skid shoe 604 to move to the retracted position when a load is applied. For example, the load sensor 612 may have a relatively flexible region, such as the shown narrowed region 612', which deforms under load. In other cases, other parts may be provided to allow the skid shoe 604 to retract (e.g., deformation of the preload spacer 616). In this embodiment, and in others, it will be appreciated that the skid shoe 604 may reach its retracted position before bottoming out on a backing structure such as the backing plate 608. It will also be appreciated that the range of motion between the extended position and the retracted position may be very small, as in the case of FIG. 13, in which the deflection between the extended and retracted positions is limited to the distance that the narrowed region 612' deforms, plus any incidental deformation of the remaining parts. Other alternatives and variations will be apparent to persons of ordinary skill in the art in view of the present disclosure.

Embodiments as described herein can be readily integrated into a floatation system to control the dynamics of header subframes, or entire headers. It will also be appreciated that the foregoing embodiments may be reconfigured or modified to provide ground force detection and floatation control at other parts of a header or header subassembly. For example, skid shoes may be added to the wing sections **112*b* of the header 112 in FIG. 4, and used by a control system 506 to control the operating ground force experienced by the wing sections 112*b***. Such systems are expected to provided improved control of actual ground force in the presence of various complicating factors that change the perceived weight of frame components. Such factors include, but are not limited to, friction within the hydraulic cylinders causing hysteresis between upward and downward travel, friction in various bearings and other moving joints causing resistance to movement, and interactions between components that interconnect the suspended parts (e.g., deflection of a cutterbar extending between frame sections causing reaction forces that are otherwise unaccounted for).

The present disclosure describes a number of inventive features and/or combinations of features that may be used alone or in combination with each other or in combination with other technologies. The embodiments described herein are all exemplary and are not intended to limit the scope of the claims. It will also be appreciated that the inventions described herein can be modified and adapted in various ways, and all such modifications and adaptations are intended to be included in the scope of this disclosure and the appended claims.

The invention claimed is:

1. An apparatus that measures ground reaction loads on a header, the apparatus comprising:

a frame comprising a skid shoe backing plate;

a skid shoe movably mounted to the frame between an extended position and a retracted position; and a load sensor assembly operatively connected between the frame and the skid shoe, wherein the load sensor assembly comprises a load sensor operatively connected between the frame and the skid shoe under a preload force that biases the skid shoe towards the extended position, and wherein the skid shoe backing plate is located between the load sensor and the skid shoe;

wherein the frame comprises a header wing section being movably attached to a header center section by an actuator; and wherein the actuator and the load sensor are operatively connected to a control system that operates the actuator in response to an output signal from the load sensor.

2. The apparatus of claim 1, wherein the load sensor assembly further comprises an adjustable preload spacer selectively movable in adjusting the preload force.

3. The apparatus of claim 2, wherein the adjustable preload spacer comprises a threaded rod.

4. The apparatus of claim 3, wherein the threaded rod is connected between the frame and the load sensor, and adjustable in moving the load sensor towards and away from the frame.

5. The apparatus of claim 4, wherein the load sensor assembly further comprises a spring connecting the load sensor to one of the frame and the skid shoe, with the spring enabling bias of the skid shoe towards the extended position.

6. The apparatus of claim 5, wherein the spring comprises one or more spring washers surrounding the threaded rod and positioned between the frame and the load sensor.

7. The apparatus of claim 5, wherein the spring comprises one or more spring washers surrounding the threaded rod, with the frame positioned between the one or more spring washers and the load sensor.

8. The apparatus of claim 1, wherein the load sensor is operatively connected between the frame and the skid shoe by a linkage having an input end at the skid shoe and an output end at the load sensor.

9. The apparatus of claim 8, wherein the linkage comprises a force-multiplying linkage in which a ratio of displacement at the input end to displacement at the output end is greater than 1:1.

10. The apparatus of claim 8, wherein the load sensor assembly further comprises a spring connecting the load sensor to one of the frame and the skid shoe, with the spring biasing the skid shoe towards the extended position; and wherein the linkage and spring generate a tensile load on the load sensor.

11. The apparatus of claim 8, wherein the load sensor assembly further comprises a spring connecting the load sensor to one of the frame and the skid shoe, with the spring biasing the skid shoe towards the extended position; and wherein the linkage and spring generate a compressive load on the load sensor.

12. The apparatus of claim 8, wherein the linkage comprises a pivot arm having a first pivot connecting the pivot arm to the skid shoe backing plate.

13. The apparatus of claim 12, wherein the output end of the linkage comprises a second pivot connecting the pivot arm to the load sensor.

14. The apparatus of claim 1, wherein the load sensor comprises a strain gauge.

15. The apparatus of claim 1, wherein the load sensor comprises a closed hydraulic circuit having a pressure sensor attached thereto.

16. The apparatus of claim 1, wherein the load sensor measures a displacement of the skid shoe.

17. The apparatus of claim 16, wherein the load sensor comprises a mechanical spring scale, an optical position sensor, or an optical proximity sensor.

18. The apparatus of claim 1, wherein the frame comprises a header support being movably attached to a header frame by a second actuator, and the second actuator and the load sensor are operatively connected to a control system that operates the second actuator in response to an output signal from the load sensor.

19. The apparatus of claim 18, wherein the header support extends in a forward direction from the header frame and wherein at least one of a draper belt roller and a cutter bar is attached to the header support.

20. The apparatus of claim 1, wherein the frame comprises a header being movably attached to a vehicle chassis by a third actuator; and wherein the third actuator and the load sensor are operatively connected to a control system that operates the third actuator in response to an output signal from the load sensor.

21. An agricultural vehicle comprising:

a chassis enabling movement across a surface;

a frame movably mounted to the chassis;

a skid shoe movably mounted to the frame between an extended position and a retracted position;

an actuator operatively connected between the frame and the chassis and configured to moves the frame relative to the chassis;

a load sensor assembly operatively connected between the frame and the skid shoe, the load sensor assembly comprising a load sensor operatively connected between the frame and the skid shoe under a preload force that biases the skid shoe towards the extended position; and a control system operatively connected to the load sensor and the actuator, and operates the actuator in response to a signal from the load sensor;

wherein the frame comprises:

a header main frame being movably attached to the chassis by the actuator;

a header subframe being movably connected to a header main frame and the chassis by the actuator; or a header wing section frame being movably attached to a header center section frame and the chassis by the actuator.

22. The apparatus of claim 1, wherein the skid shoe comprises a flexible sheet secured to the skid shoe backing plate at a plurality of locations.

23. The apparatus of claim 1, wherein the skid shoe backing plate comprises an opening and wherein the load sensor assembly comprises a link that extends through the opening to contact the skid shoe.

24. The apparatus of claim 23, wherein:

the skid shoe backing plate comprises a first bracket and a second bracket, the first bracket and the second bracket extending on a side of the skid shoe backing plate facing away from the skid shoe;

the first link being pivotally connected to the first bracket; and the load sensor being operatively connected between the first link and the second bracket.

* * * * *